AUTOMATIC TELEPHONE EXCHANGE HAVING SOME LINES CONNECTED TO TWO SELECTOR STAGES AND SOME LINES CONNECTED TO ONLY ONE SELECTOR STAGE

Filed July 13, 1964 2 Sheets-Sheet 1

INVENTORS
JOHANNES M. BROUWER
HENRI P.J. GRUBBEN
BY
F.A. Trifari
AGENT

AUTOMATIC TELEPHONE EXCHANGE HAVING SOME LINES CONNECTED TO TWO SELECTOR STAGES AND SOME LINES CONNECTED TO ONLY ONE SELECTOR STAGE

Filed July 13, 1964 2 Sheets-Sheet 2

INVENTORS
JOHANNES M. BROUWER
HENRI P. J. GRUBBEN
BY
AGENT

United States Patent Office 3,342,946
Patented Sept. 19, 1967

3,342,946

AUTOMATIC TELEPHONE EXCHANGE HAVING SOME LINES CONNECTED TO TWO SELECTOR STAGES AND SOME LINES CONNECTED TO ONLY ONE SELECTOR STAGE

Johannes Martinus Brouwer and Henri Peter Johannes Grubben, Hilversum, Netherlands, assignors to North American Philips Company, Inc., New York, N.Y., a corporation of Delaware Filed July 13, 1964, Ser. No. 382,233
Claims priority, application Netherlands, July 16, 1963, 295,403
6 Claims. (Cl. 179—18)

ABSTRACT OF THE DISCLOSURE

An automatic telephone exchange is provided having two selector stages, and a controlled connection circuit for interconnecting the selector stages. In a system wherein connections are normally established between lines of one type and lines of another type more economical use is made of the selector stages by connecting lines of the one type to both selector stages, and connecting lines of the other type to only one or the other selector stages.

The invention relates to a device for use in an automatic telephone system comprising bilateral connection circuits for the through-connection of lines connected to said device, there being provided connecting means for establishing a connection between an arbitrary line through which a call is received and one side of a connection circuit and connecting means for establishing a connection between a selected line for which the call is intended and the other side of the connection circuit.

Such devices are employed inter alia in automatic telephone exchanges for transit communication between lines coming in and going out in different directions and also as line reductors for the communication between a group of subscribers and an automatic telephone exchange through a small number of lines. In the last case the lines go out in one direction and come in in one direction, i.e. the direction towards and from the telephone exchange. An example of such a use may be a national telephone network of industrial exchanges of different enterprises A, B and C, said exchanges being spread over the country. The connections between the industrial exchanges of the same enterprise are established through transit exchanges which communicate with each other for example through lending lines, which are common to the various enterprises. In such a transit exchange lines are connected which are associated with the industrial exchanges of the enterprises A, B, and C at the place of the transit exchange and lines coming from and going to transit exchanges located at different other places.

The invention has for its object to utilise to the optimum the possibilities of connection of a line to a device of the kind set forth in order to obtain for example in the use as a transit exchange in the national telephone network of industrial exchanges given by way of example a maximum number of connections of lines coming from different industrial exchanges to lines coing from and going to other transit exchanges.

The device according to the invention is characterized in that for establishing connections between a first group of lines and a second group of lines the connecting means are adapted for establishing a connection between a line of the second group divided into two sub-groups and one or the other side of the connection circuit in accordance with the association of the line with one or with the other sub-group, whilst the connecting means are furthermore adapted to establish a connection between a line of the first line group and one side or the other side of a connection circuit.

The invention and its advantages will now be described more fully with reference to the drawing.

In the figures the parts forming a unit as far as their functions are concerned, for example a connection circuit, are designated by capital letters and the components associated in a functional unit are denoted by the capital letters concerned and a two-digit indication, whereas a relay contact is denoted in the same manner as the corresponding relay, but the letters being small. If a relay has more than one winding or more than one contact, the number of the winding or of the contact is indicated before the letter denomination.

Figure 1:
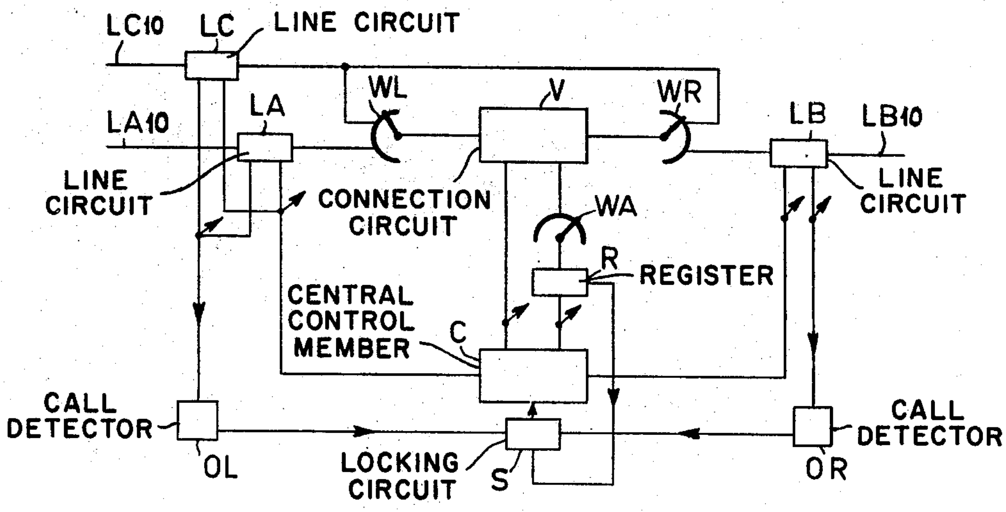
FIG. 1 is a block diagram of an embodiment of a device according to the invention.

FIG. 1 shows a block diagram of an automatic telephone exchange for transit communication for use in the national telephone network referred to by way of example in the preamble for industrial exchanges. In this figure LA10 indicates a line coming in from an industrial exchange of a given enterprise A. At LB10 there is indicated a line coming in from a further industrial exchange and at LC10 a line connecting the exchange with a further transit exchange. The lines indicated terminate each in a line circuit LA, LB and LC respectively in the exchange. The exchange comprises a plurality of connection circuits V, one of which is shown in the figure and it comprises furthermore two groups of selectors WL and WR, each connection circuit being connected on one side to a selector WL and on the other side to a selector WR. The number of lines which can be connected to the selectors is determined by the number of contacts of a selector in one bank. With a given type of selector the number of contacts is fixed, so that there can be connected no more lines than the number of contacts of one bank. With a type of selector frequently used by the applicant the number of contacts is 54, so that at the most 54 lines can be connected to a selector. With the exchange shown in FIG. 1 the number of possibilities of connecting a line is considerably increased without an increase in the number of selector stages. For this purpose the lines from the industrial exchanges are connected to contacts of selector WL or to contacts of selector WR and the lines from and to other transit exchanges are connected to corresponding contacts of selector WL and selector WR. Thus the line circuit LA is connected to contacts of selector WL and the line circuit LB is connected to contacts of selector WR and the line circuit LC is connected to corresponding contacts of selector WL and selector WR. A connection for example of the line circuit LA is termed hereinafter a single connection and a connection of the line circuit LC for example is termed hereinafter a double connection. For distinguishing between a single connection of the selector WL and a single connection of the selector WR, the first-mentioned connection, in accordance with the place of selector WL in FIG. 1, is termed a left-hand single connection and the other connection is termed a right-hand single connection. In this manner the possibilities of connecting a line, which possibilities are determined by the available contacts of the selectors WL and WR are utilized to the optimum. If, for example, the selectors have 54 contacts in one bank, the number of possibilities of connecting a line is equal to 108 and if, for example, the number of double connections is equal to 10, there can be connected in total 98 lines, 10 of which are double connections and 88 are single connections.

The single connections are considered to be associated with the same group of connections and in the same manner the double connections are considered to be associated with the same group of connections. The group of single connections is, in accordance with the foregoing, divided into two subgroups, one of which comprises the left-hand single connections and the other comprises the right-hand single connections.

When a call is received from a line of single connection, the left-hand call detector OL or the right-hand call detector OR responds in accordance with the fact whether the line is connected on the left-hand side or on the right-hand side respectively. A call of a line of double connection is dealt with only on the left-hand side and only the left-hand call detector OL responds. It is, of course, also possible to arrange the exchange so that a call from a double-connection line is dealt with on the right-hand side, whereas it is also possible to treat calls from given double-connection lines on the left-hand side and calls from other double-connection lines on the right-hand side. As soon as a call is detected, the call detector concerned occupies a central control-member C if it is free through a locking circuit S, which gives access to only one call detector at a time to the central control-member. The central control-member occupies a free register R and adjusts the selector WA connected to the register to a free connection circuit V. As soon as the register is connected to the connection circuit, the central control-member is coupled with the connection circuit. The central control-member then starts the left-hand selector WL or the right-hand selector WR, in accordance whether the call is detected by the left-hand call detector OL or the right-hand call detector OR and adjusts the selector to the calling line.

In order to serve different lines in different ways, the line circuits comprise identifications corresponding to the different services, for example by means of wire connections between an individual multiple point joined to the line circuit and a number of common identification conductors. After the adjustment of the selector the central control-member obtains the identification of the calling line by means of an after-test which is carried out through the connection circuit, the adjusted selector, the multiple point and the identification conductors. For distinguishing a double-connection line and a single-connection line a special identification mark is given to a double-connection line. The central control-member is thus capable of assessing by means of the after-test that the calling line is a single-connection line or a double-connection line, whilst the central control-member has already available the information that the line is connected on the left-hand side or on the right-hand side.

The further treatment of a call depends upon the fact whether the call originates from a single-connection line or a double-connection line.

A call from a single-connection line is dealt with as follows. The central control-member transmits the data of the calling line to the register and switches on the calling line to the register. In the register it is now registered that the calling line is connected on the left-hand side or on the right-hand side and, moreover, that the calling line is a single-connection line. The central control-member then interrupts the connection to the connection circuit and the register. The register conveys a dialing tone to the calling line and receives subsequently the number of the desired line. The number of the line called is registered in the register and after the register has received the full number, it occupies the central control-member C through the locking circuit S. The register then transfers the number of the line called and the data of the calling line to the central control-member and couples the latter with the conection circuit. A call from a single-connection line is normally intended for a double-connection line and may be intended for a line located on the other side of the exchange in single-connection, when a communication between a left-hand and a right-hand single connection line. In the telephone mains given by way of example the single-connection lines are associated with industrial exchanges and the transit exchange described by way of example serves to connect these lines to lines from and towards further transit exchanges located at different places, so that in this example a call from a single-connection line is always intended for a double-connection line. A double-connection line has the same number in the exchange on the left-hand side and on the right-hand side and the central control-member adjusts the right-hand selector WR or the left-hand selector WL selectively to the double-connection line called in accordance with the fact whether the calling line is connected on the left-hand side or on the right-hand side. In this manner, in the event of a call from the line LA10, first the selector WL is adjusted to the calling line and after the reception of the dialed number the selector WR is adjusted to the line called. When a call is received from the line LB10, the same process is performed, but in the reverse sense and the selector WR is adjusted to the calling line and the selector WL is subsequently adjusted to the line called.

In the event of a call from a double-connection line, as in the event of a call from a single-connection line connected on the left-hand side, the selector WL is adjusted to the calling line by the central control-member C. However, this call may be intended for a single-connection line on the left hand side and for a single-connection line on the right-hand side. In the latter case it is sufficient to adjust the right-hand selector WR to the desired line. However, if it appears that the call is intended for a left-hand single-connection line, it is not sufficient to adjust the left-hand selector WL to the desired line, but first the selector WR is selectively adjusted to the calling double-connection line and after the adjustment of the right-hand selector the selector WL is adjusted to the desired single-connection line. In the telephone exchange taken as an example the selector WR is selectively adjusted to the calling double-connection line independent of the fact whether the call is intended for a left-hand connection or a right-hand connection, directly after the central control-member has assessed by the after-tests that the call originates from a double-connection line. For this purpose the central control-member marks through the adjusted selector WL the corresponding output of selector WR and the central control-member adjusts the selector WR to the marked output. The central control-member then connects the calling line to the register and transmits the data of the calling line to the register, after which it interrupts the connection to the register and the connection circuit. The register conveys the dialing tone to the calling line and after the reception of the complete number of the desired line, the register occupies the central control-member through the locking circuit S and couples the central control-member with the connection circuit. The register transmits subsequently the number of the desired line and the data of the calling line to the central control-member. In the central control-member there is provided a number test device which serves to determine, in the event of a call from a double-connection line, from the number chosen whether the call is intended for a left-hand connection or a right-hand connection. The central control-member then starts the left-hand selector WL or the right-hand selector WR in accordance whether the call is intended for a left-hand connection or a right-hand connection and adjusts the selector to the desired line. At the readjustment of the selector WL or of the selector WR the initial connection of the connection circuit to the calling line is interrupted through said selector, but the connection to the calling line through the other selector is maintained.

Figure 2:
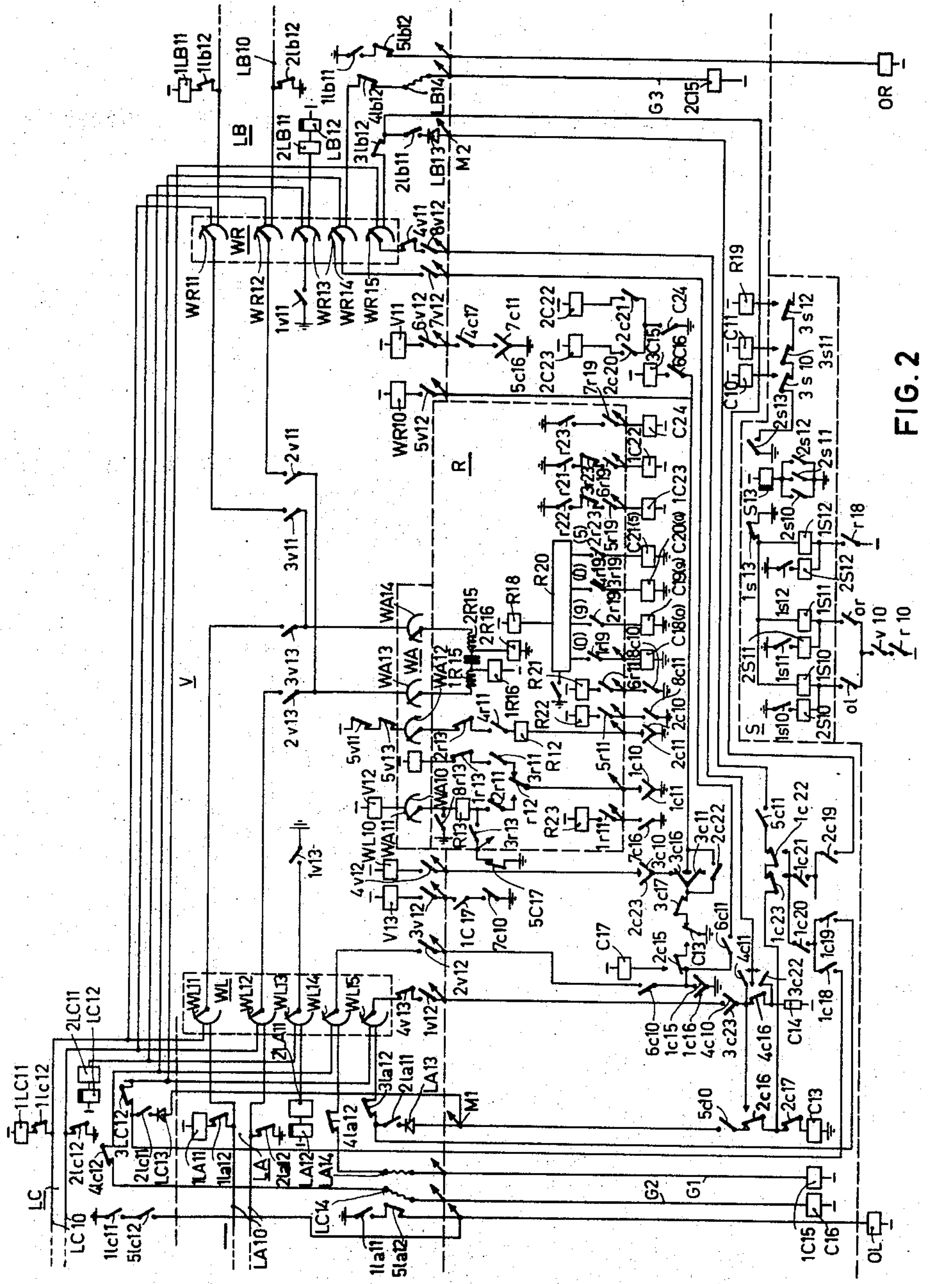
FIG. 2 shows a detailed embodiment of a device according to the invention.

With reference to FIG. 2 an embodiment of the device according to the invention is explained more in detail. In this figure there is shown in a simplified form a detail structure of the automatic telephone exchange shown in a block diagram in FIG. 1; the circuit elements not essential to an explanation of the invention are omitted.

*Call from a single-connection line*

A call is characterized by the completion of a loop through the conductors of the line concerned. At a call from the line LA10, the line relay LA11 is energized in the following current circuit: earth, 21*a*12, line loop, 11*a*12, winding 1LA11, voltage. The contact 11*a*11 establishes a current circuit for the call detector relay OL: earth, 11*a*11, 51*a*12, winding OL, voltage and the contact 21*a*11 prepares a test current circuit for the subsequent adjustment of the selector. If there is both a free connection circuit V and a free register R, both the contact *v*10 and the contact *vr*10 are closed and the contact *o*1 of the energized call detector relay completes a current circuit for relay S10 in the locking circuit S: voltage, *r*10, *v*10, *o*10, winding 1S10, 1*s*13, earth. The relay S10 is energized and the contact 1*s*10 closes a holding circuit through the winring 2S10 independent of the contact 1*s*13 and the contact 2*s*10 closes a current circuit for the locking relay S13. Relay S13 is energized and the break contact *s*13 blocks the locking circuit for the other call detector and for the registers. The contact 2*s*13 closes a current circuit for the relay C10 in the central control-member; earth, 2*s*13, 3*s*10, winding C10, voltage. In one of the free registers R the coupling contacts 1*r*11 to 6*r*11 are closed and the contact 1*c*10 closes a current circuit for the rotary magnet WA10 of the selector WA: earth, 1*c*10, *r*12, 3*r*11, 1*r*13, magnet WA10, voltage. The rotary magnet is energized and the selector finds a free connection circuit. As soon as the selector has reached a free connection circuit, the test relay R12 is energized in the following test current circuit, voltage, 5*v*11, 5*v*13, contact and wiper of the bank WA12, 2*r*13, 4*r*11, winding R12, 2*c*10, earth. The break contact *r*12 interrupts the current circuit by the rotary magnet WA10 and the make contact *r*12 closes a current circuit for the relay R13 and the coupling relay V12: earth, 1*c*10, *r*12, 2*r*11, winding R13, contact and wiper of the arc WA11, winding V12, voltage. The relays R13 and V12 are energized and the contact 2*r*13 interrupts the test current circuit, so that the test relay R12 is de-energized and the contact 1*r*13 interrupts the current circuit for the rotary magnet, whilst the contact 3*r*13 closes a holding circuit which is independent of the contact *r*12, for the relays V12 and R13. The contacts 1*v*12 to 8*v*12 of the coupling relay V12 couple the central control-member with the free connection circuit V. The contact 4*v*12 closes a current circuit for the rotary magnet WL10 of the left-hand selector WL: earth, *c*13, 3*c*17, 3*c*16, 3*c*10, 4*v*12, magnet WL10, voltage. The rotary magnet is energized and the selector finds, by free choice, the calling line. As soon as the selector has reached the calling line, the test relay C13 is energized in the following test current circuit: earth, winding C13, 2*c*17, 2*c*16, 5*c*10, multiple point M1, diode LA13, 21*a*11, 31*a*12, contact and wiper of the bank WL15, 4*v*13, 1*v*12, 4*c*10, 4*c*16, resistor C14, voltage. The break contact *c*13 interrupts the current circuit for the rotary magnet WL10 and the make contact *c*13 closes the following after-test current circuit: earth, *c*13, 2*c*15, 6*c*10, 2*v*12, wiper and contact of the arm WL14, 41*a*12, multiple point LA14, identification conductor G1, winding 1C15 of the identification relay C15, voltage. In this after-test current circuit the identification relay C15 is energized and the contact 1*c*15 closes a holding circuit, which is independent of the contact 2*c*15 and the contact 2*c*15 closes a current circuit for relay C17: earth, make contact *c*13, make contact 2*c*15, winding C17, voltage. The relay C17 is energized and the contacts of this relay finally release the central control-member.

A multiple point adjoined to a line circuit LA14 can be connected through wire connections to a number of identification conductors common to all line circuits, the figure shows only two of them, i.e. a conductor G1, which is connected to a winding of the identification relay C15 and a conductor G2, which is connected to a winding of the identification relay C16. The multiple point of a single connection is connected through a wire to the identification conductor G1 and the multiple point of a double connection is connected through a wire to the identification conductor G2. For the sake of clarity, an additional identification conductor G3 is shown on the right-hand side for the right-hand single connections, said identification conductor being connected to a second winding of the identification relay C15.

The register R comprises three relays R21 to R23 for registering the data of the calling line. The relay R23 serves for registering the fact that the call originates from a double-connection line and the relay R21 and the relay R22 serve for registering the detection of the call by the left-hand call detector and the right-hand call detector respectively. When only the relay R21 or R22 is energized, this means that the call originates from a left-hand or a right-hand single connection line and if apart from relay R21 or R22 also relay R23 is energized, this means that the call originates from a double-connection line. The contact 8*c*10 of the relay C101 energized when the central control-member is occupied closes a current circuit for relay R21. The relay R21 is thus energized, whereas the relay R23 is not energized during the after-test. The relay R21 closes in a manner not shown a holding circuit for itself and stores the registered information for transmitting said information together with the number of the line called to the central control-member.

The relay C17, which is energized at the termination of the after-test, operates furthermore as follows: The contact 2*c*17 interrupts the test current circuit for test relay C13 and contact 3*c*17 interrupts the current circuit for the rotary magnet WL10, whilst contact 5*c*17 interrupts the holding circuit for the relay R13 and the coupling relay V12. The contact 1*c*17 closes a current circuit for the through-connection relay V13; earth, 7*c*10, 1*c*17, 3*v*12, winding V13, voltage. The test relay C13 is de-energized, like the relay R13 and the coupling relay V12, whilst the through-connection relay V13 is energized and closes in a manner not shown a holding circuit for itself. The make contact *c*13 of the test relay interrupts the current circuit for relay C17, so that this relay is de-energized and the contacts of the coupling relay V12 interrupt the connection between the central control-member and the connection circuit. The coupling contact 2*v*12 interrupts the after-test current circuit so that the identification relay C15 is de-energized. The contact 4*v*13 of the through-connection relay interrupts the test current circuit on the side of the wiper of the bank WL15 and contact 5*c*13 removes the free marking of the output of selector WA corresponding to the connection circuit, whereas the contact 1*v*13 closes a current circuit for the line relay LA11 and the separation relay LA12: earth, 1*v*13, wiper and contact of the bank WL13, winding LA11, winding LA12, voltage. The separation relay LA12 is energized and the line relay LA11 is energized in this current circuit, whilst the contacts 11*a*12 and 21*a*12 interrupt the current circuit for the line relay through the winding 1LA11 and separate the line relay from the line. The contact 31*a*12 interrupts the test current circuit on the side of the contact of the arc WL15 and the contact 41*a*12 interrupts the after-test circuit and the contact 51*a*12 interrupts the current circuit for the call detector relay OL. The call detector relay is de-energized, so that in order of succession the relays S10 and S13 in the locking circuit are de-energized and finally the relay G10 is de-energized. The central control member is then again in the rest position and may be re-occupied for processing a further call.

The contacts 2*v*13 and 3*v*13 of the through connection relay V13 connect the conductors of the line LA10 on to the register R, and the register R occupies itself by opening in a manner not shown the coupling contacts 1*r*11 to 6r11. The conductors of the line LA10 are connected in the register R through the transformer windings 1R15 and 2R15 to the windings 1R16 and 2R16 of a pulse relay R16 and in a manner not shown a dialing tone is conveyed to the line through the transformer windings.

The pulse relay R16 passes on by means of the contact r16 the dialing tone series to a circuit R20, which counts the number of dialing pulses of each series and then registers them in a storage. After the reception of the complete number, which consists in this case of two digits, a relay R18 is energized in a manner not shown. The contact r18 closes a current circuit for relay S12 in the locking circuits S, so that the relays S12, S13 and R19 are energized in order of succession like the relays S10, S13 and C10 after the response of the call detector OL.

The dialing pulse registering circuit R20 includes, in general, two groups of ten outputs each for transmitting the unit digit an the decade digit of the dialed number and the central control-member includes a corresponding number of digit relays for taking over the dialed number. Of each group only two outputs with the corresponding digit relays are shown, i.e. the outputs corresponding to the unit digits 0 and 9 and to the decade digits 0 and 5 and the corresponding digit relays C18 and C19, C20 and C21 respectively. For the line LA10 there is chosen the number 09 for the line LB10 the number 59 and for the line LC10 the number 00. It will be assummed by way of example that the call from the line LA10 is intended for the line LC10, whilst it should be noted that a through-connection to the line LB10 is also included in the possibilities of connection. The contacts 1r19 to 4r19 connect the outputs of the dialing pulse registering circuit P20 to the windings of the digit relays C18 to C21. The dialed number of the line LC10 is 00, so that the digit relays C18 and C20 are energize.

The central control member has three relays C22 to C24 for taking over the data of the calling line from the register relays R21 to R23. The contacts 5r19 to 7r19 close a current circuit for one or more of the relays C22 to C24, in accordance with the data registered in the register relays. In the present case only the relay R21 is energized, so that alone the contact 6r19 closes a current circuit, earth r21, 3r23, 6r19, winding 1C22, earth. The relay C22 is energized and thus indicates that the central control-number must adjust the right-hand selector. When relay C23 has been energized, it is indicated that the left-hand selector must be adjusted. The contact 8r19 closes a current circuit for coupling relay V12, the contacts of which couple the central control-number with the connection circuit. The contact 2c22 closes a current circuit for the rotary magnet WR10 for the right-hand selector WR: earth, c13, 3c17, 3c22, 5v12, magnet WR10, voltage. The rotary magnet is energized and the right-hand selector finds the output marked via the contact pyramid of the digit relays C18 to C21. As soon as the selector has reached the marked output, the test relay C13 is energized in the following test current circuit: voltage, resistor C14, 3c22, 8v12, 4v11, wiper and contact of the arc WR15, connecting conductor to the line circuit LC, 31c12, a marking conductor 1c18, 1c20, make contact 1c22, 1c23, 2c17, winding C13, earth. The break contact c13 interrupts the current circuit for the rotary magnet WR10, so that the selector is halted at the marked output.

The marking conductor which connects an output of the contact pyramid with the line circuit LC is decoupled by diodes LC13 from the multiple point M1 which is marked by earth potential for the adjustment of the left-hand selector to a calling line from the central control-member. It is thus avoided that during the selective adjustment of the left-hand selector to a line called the multiple point M1 is marked through the contact (21c11) of the line relay connecting this multiple point to the marking conductor, which contact is closed when the line called is occupied. The diodes LA13 and LB13 decouple each in a similar manner the marking conductor of the line circuit LA and LB respectively from the multiple point M1 and the corresponding multiple point M2 respectively on the right-hand side. The further composition of connections is performed in known manner not shown in the figure.

A call from the line LB10 is treated in the same manner as a call from the line LA10 on the understanding, however, that the connection with the line called is performed from right to left instead of being performed from left to right. In the following the differences between the composition of the connections of the line LB10 to the line LC10 on the one hand and of the line LA10 to the line LC10 on the other hand are explained briefly. In the event of a call from LB10 the right-hand call detector relay OR is energized so that in order of succession the relays S11, S13 and C11 are energized. By means of the relay C11 it is indicated that now a call from a line connected on the right-hand side is to be processed. The contact 3c11 closes a current circuit for the right-hand rotary magnet WR10 and the right-hand selector finds the calling line. As soon as the selector has reached the calling line, the test relay C13 is energized in the following test current circuit, voltage, resistor C14, 4c16, 4c11, 8v12, 4v11, wiper and contact of the bank WR15, 31b12, 21b11, diode LB13, multiple point M2, 5c11, 1c22, 1c23 2c17, winding C13, earth. The make contact c13 then closes the following after-test current circuit: earth, c13, 2c15, 6c11, 7v12, wiper and contact of the bank WR14, 41b12, LB14, conductor G3, winding 2C15, voltage. In this after-test current circuit the identification relay C15 is energized so that subsequently the relay C17 is energized and finally the central control-member is released in the manner described for a call from the line LA10. The contact 4c17 closes a current circuit for the right-hand through-connection relay V11: earth, 7c11, 4c17, 6v12, winding V11, voltage.

In the register the relay R22 is energized in the current circuit: earth, 8c11, 5r11, winding R22, voltage. The relay R23 is not energized. After the re-occupation of the central control-member the relay C23 is energized in the current circuit: earth, r22, 2r23, 5r19, winding 1C23, voltage and it thus indicates that now the left-hand selector must be adjusted. Contact 2c23 closes the current circuit for the rotary magnet WL10 of the left-hand selector and the selector finds the output marked by the contact pyramid of the digit relays in the line circuit LC. As soon as the selector has reached the marked output, the test relay C13 is energized in the following test current circuit, voltage, resistor C14, 4c16, 3c23, 1v12, 4v13, wiper and contact of the arc WR15, 31c12, marking conductor 1c18, 1c20, 1c23, 2c17, winding C13, earth. The break contact c13 interrupts the current circuit for the rotary magnet WL10 and the selector is arrested at the desired output. The composition of the connections is otherwise performed in a known manner (not shown).

*Call from a double-connection line*

A call from the line LC10 is processed up to the after-test in quite the same manner as a call from the line LA10 and the following description starts from the instant when the test relay C13 is energized. The make-contact c13 closes an after-test current circuit: earth, c13, 2c15, 6c10, 2v12, wiper and contact of the arm WL14, 41c12, LC14, conductor C2, winding C16, voltage. In this after-test current circuit the identification relay C16 is energized. The break contact 4c16 interrupts the test current circuit for the left-hand selector, so that the test relay C13 is de-energized and the contact 1c16 closes a holding circuit for relay C16 independently of the contact c13. The break contact c13 then closes a current circuit for the rotary magnet WR10 of the right-hand selector WR: earth, break contact c13, 3c17, 3c16, 5v12, magnet WR10, voltage. The rotary magnet is energized and the right-hand selector finds the right-hand connection of the line circuit LC. As soon as the selector has reached this connection, the test relay C13 is energized in the following rest current circuit: voltage, resistor C14, make-contact 4c16, 8v12, 4c11, wiper and contact of the bank WR15, connecting line for the line circuit LC, contact and wiper of the bank WR15, 4v13, 1v12, 4c10, make contact 2c16, 2c17, winding C13, earth.

The break contact c13 of the test relay has also closed a current circuit for the identification relay C15; earth, c13, 3c17, 3c16, 6c16, winding 3C15, voltage. The identification relay C15 is energized and after the test relay in the said test current circuit has been energized, the make contact c13 closes a current circuit for the relay C17: earth, c13, 2c15, winding C17, voltage, whilst the break contact c13 interrupts the current circuit for the rotary magnet WR10. The relay C17 is energized and finally releases the central control-member in the manner described for a call from the line LA10.

The contact 4c17 closes a current circuit for the right-hand through-connection relay V11; earth, 5c16, 4c17, 6v12, winding V11, voltage. The relay V11 is energized and closes in a manner not shown a holding circuit for itself and the contacts 2v11 and 3v11 switch on the conductors of the line LC10 towards the register through the right-hand selector, whereas the left-hand through-connection relay V13 switches on the conductors through the left-hand selector towards the register.

In the register the registering relay R23 is energized in the current circuit: earth, 7c16, 1r11, winding R23, voltage, whilst the relay R21 is also energized. The register conveys a dialing tone to the line LC10 and after the reception of the complete number of the desired line the register occupies the central control-member in the manner described above. The register then transfers the number of the desired line to the digit relays C18 to C21 and the date of the calling line are transferred to the relays C22 to C24. The relay C24 is energized in the current circuit: earth, 1r23, 7r19, winding C24, voltage, whereas the break contacts 2r23 and 3r23 prevent a current circuit from being formed by the relays C22 and C23 through the windings 1C22 and 1C23. The energized relay C23 indicates that the call originates from a double-connection line so that it must first be tested whether the call is intended for a left-hand or a right-hand connection.

In the example given above the number consists of two digits and the left-hand and the right-hand single connections have different decade digits, whilst particularly the connections with the decade digit 0 are arranged on the left-hand side and the connections with the decade digit 5 are arranged on the right-hand side. As a result of the energization of the relay C24, the number then registered in the digit relays C18 to C21 is tested and in this example it suffices to perform a test for the decade digit. When the call is intended for the line LA10 (09), the digit relays C19 and C20 are energized and the contact c24 closes a current circuit for relay C23; earth, c24, 2c20, winding 2C23, voltage. The relay C23 is energized so that it is achieved in the manner described above that the left-hand selector is adjusted to the desired line. If the dialed number starts by the decade digit 5, the relay C22 is energized in the current circuit: earth, c24, 2c21, winding 2C22, voltage, so that in the manner described above it is achieved that the right-hand selector is adjusted to the desired line.

Before adjusting the left-hand selector or the right-hand selector selectively to the desired line, the connection with the calling line through this selector is interrupted in a manner not shown whilst the connection to the calling line is maintained through the other selector.

What is claimed is:

1. An automatic telephone exchange system for selectively establishing connections between first and second groups of telephone lines, comprising first and second groups of telephone lines, said second group of lines comprising first and second subgroups of lines, said system further comprising first and second group of terminals, connecting circuit means comprising means for selectively providing interconnections between said first and second groups of terminals, means connecting said lines of said first group of lines to separate terminals of said first and second groups of terminals whereby each line of said first group of lines is connected to corresponding terminals of both said first and second group of terminals, means connecting said first and second subgroups of lines only to separate terminals of said first and second groups of terminals respectively, and control circuit means connected to said connecting circuit means, said control circuit means being responsive to signals on said lines for controlling said connecting circuit means to selectively interconnect terminals of said first and second groups of terminals.

2. An automatic telephone exchange system for selectively establishing connections between first and second groups of telephone lines, comprising first and second groups of telephone lines, said system further comprising first and second groups of a plurality of terminals, connecting circuit means for selectively interconnecting terminals of said first and second groups, means connecting each line of said first groups of lines to separate terminals of said first and second groups of terminals, with each line of said first group being connected to a terminal of said first group of terminals and a terminal of said second group of terminals, means connecting each line of said second group of lines to separate terminals of said first and second groups of terminals with each of said lines of said second group being connected only to terminals of one of said groups of terminals, and control circuit means connected to said connecting circuit for controlling said connecting circuit means for selectively interconnecting a line of said first group of lines and a line of said second group of lines.

3. An automatic telephone exchange system for selectively establishing connections between first and second groups of telephone lines, comprising first and second groups of telephone lines, said system further comprising first and second selector means each comprising means for selectively connecting a plurality of terminal means to common terminal means, connecting circuit means interconnecting said common terminal means, said second group of lines comprising first and second subgroups of lines, means connecting said lines of said first group of lines to separate terminal means of said first and second selector means whereby each line of said first group of lines is connected to corresponding terminal means of both said first and second selector means, means connecting said lines of said first and second subgroups of lines separately to other terminal means of only said first and second selector means respectively, and control circuit means connected to said selector means and responsive to signals on said lines for selectively controlling said selector means.

4. The system of claim 3, wherein said control circuit means comprises means for testing the lines of said second group of lines to determine the subgroup of a selected line of said second group of lines.

5. The system of claim 3, wherein said control circuit means comprises means responsive to calling signals on a given line of said first group of lines for adjusting both of said selector means to connect said given line to said connecting circuit means, and means for subsequently adjusting one of said selecting means to connect a called line of said second group of lines ot said connecting circuit means whereby a through connection is established between said given line and said called line.

6. An automatic telephone exchange system for selectively establishing connections between first and second groups of telephone lines, comprising first and second groups of telephone lines, said system comprising first and second selector means each having a plurality of terminal means and a common terminal means and comprising means for selectively connecting said plurality of terminal means to said common terminal means, connecting circuit means interconnecting said common terminal means, said second group of lines comprising first and second subgroups of lines, means connecting said lines of said first group of lines to separate terminal means of said first and second selector means whereby each line of said first group of lines is connected to corresponding terminal means of both said first and second selector means, means connecting said lines of said first and second subgroups of lines separately to other terminal means of only said first and second selector means respectively, control circuit means connected to said selector means and responsive to calling signals on the lines of said first and second subgroups of lines for adjusting said first and second selector means respectively to connect a calling line to said connecting circuit means, said control circuit means comprising means responsive to signals on said calling line for adjusting the other selector means to connect said connecting circuit to a called line.

References Cited

FOREIGN PATENTS

| | | |
|---|---|---|
| 729,158 | 5/1955 | Great Britain. |
| 43,158 | 10/1956 | Germany. |

KATHLEEN H. CLAFFY, *Primary Examiner.*

L. A. WRIGHT, *Assistant Examiner.*